US009521727B1

(12) United States Patent
Clements

(10) Patent No.: US 9,521,727 B1
(45) Date of Patent: Dec. 13, 2016

(54) LIGHTING FIXTURE WITH MOTION SENSOR AND BATTERY TEST SWITCH

(71) Applicant: Steven Russell Clements, Atlanta, GA (US)

(72) Inventor: Steven Russell Clements, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 98 days.

(21) Appl. No.: 14/291,380

(22) Filed: May 30, 2014

(51) Int. Cl.
| F21V 7/04 | (2006.01) |
| H05B 37/02 | (2006.01) |
| F21V 8/00 | (2006.01) |
| G02B 6/36 | (2006.01) |
| F21K 99/00 | (2016.01) |
| F21Y 101/02 | (2006.01) |

(52) U.S. Cl.
CPC ........... H05B 37/0227 (2013.01); F21K 9/175 (2013.01); G02B 6/0078 (2013.01); G02B 6/0088 (2013.01); G02B 6/36 (2013.01); F21Y 2101/02 (2013.01)

(58) Field of Classification Search
CPC ..... H05B 37/0227; G02B 6/36; G02B 6/0088; F21K 9/175
USPC ......................................................... 362/235
See application file for complete search history.

(56) References Cited

U.S. PATENT DOCUMENTS

| D85,382 S | 10/1931 | Guth |
| D122,236 S | 8/1940 | Scribner |
| D123,768 S | 12/1940 | Scribner |
| D168,974 S | 3/1953 | Spaulding |
| 3,272,978 A | 9/1966 | Jackson |
| D232,257 S | 7/1974 | Paulson |
| 3,838,268 A | 9/1974 | Fabbri |
| D266,578 S | 10/1982 | Moshier |
| 4,531,180 A | 7/1985 | Hernandez |
| 5,040,098 A | 8/1991 | Tanaka et al. |
| 5,195,822 A | 3/1993 | Takahashi et al. |
| 5,440,470 A | 8/1995 | Ly |

(Continued)

FOREIGN PATENT DOCUMENTS

WO   WO 2012030387   8/2014

OTHER PUBLICATIONS

International Search Report for PCT/US2014/026328, mailed Aug. 28, 2014.

(Continued)

Primary Examiner — Anh Mai
Assistant Examiner — Matthew Peerce
(74) Attorney, Agent, or Firm — King & Spalding LLP

(57) ABSTRACT

The present disclosure provides systems and techniques for a lighting fixture with a motion sensor and an emergency battery test switch. The disclosure herein provides a lighting fixture for fitting within a ceiling, wall, or other surface. The lighting fixture includes a frame which forms the perimeter of the lighting fixture. The frame includes two endplates and two side bars, forming an outer frame of the lighting fixture. The frame further includes a device mounting bracket coupled between the two endplates, separating the outer frame into two frames. Each of the two frames houses a lightguide which is coupled to a light source. Each of the light guides are coupled with a back reflector. The motion sensor and emergency battery test switch can be coupled to the device mounting bracket or elsewhere on the frame.

18 Claims, 3 Drawing Sheets

(56) References Cited

U.S. PATENT DOCUMENTS

| | | | |
|---|---|---|---|
| D386,804 S | 11/1997 | Engel | |
| 5,704,703 A | 1/1998 | Yamada et al. | |
| 5,931,556 A | 8/1999 | Herst et al. | |
| 6,161,939 A * | 12/2000 | Bansbach | F21S 8/061 362/223 |
| 6,299,327 B1 | 10/2001 | Camarota | |
| D456,938 S | 5/2002 | Wardenburg | |
| D459,825 S | 7/2002 | Field | |
| D465,869 S | 11/2002 | Bodell | |
| 6,527,422 B1 | 3/2003 | Hutchison | |
| 6,595,662 B2 | 7/2003 | Wardenburg | |
| D496,121 S | 9/2004 | Santoro | |
| 6,945,668 B1 | 9/2005 | Orlov et al. | |
| 7,131,753 B1 | 11/2006 | Edwards, Jr. | |
| D543,652 S | 5/2007 | Hargreaves | |
| D544,139 S | 6/2007 | Hargreaves | |
| D544,983 S | 6/2007 | Hargreaves | |
| D544,985 S | 6/2007 | Hargreaves | |
| D544,987 S | 6/2007 | Hargreaves | |
| D545,484 S | 6/2007 | Hargreaves | |
| D548,386 S | 8/2007 | McDowell | |
| D597,241 S | 7/2009 | Fabbri et al. | |
| 7,604,379 B2 | 10/2009 | Stenback et al. | |
| 7,607,793 B2 | 10/2009 | Coushaine et al. | |
| D605,342 S | 12/2009 | Chung et al. | |
| D608,490 S | 1/2010 | Chung et al. | |
| D610,735 S | 2/2010 | Chien | |
| 7,722,228 B2 | 5/2010 | Broer | |
| D632,419 S | 2/2011 | Ng et al. | |
| D633,247 S | 2/2011 | Kong et al. | |
| D634,060 S | 3/2011 | Wardenburg | |
| D636,112 S | 4/2011 | Chung et al. | |
| D637,162 S | 5/2011 | Bridgman | |
| D637,341 S | 5/2011 | Wardenburg | |
| 7,963,689 B2 | 6/2011 | Lee | |
| D653,376 S | 1/2012 | Kong et al. | |
| D664,699 S | 7/2012 | Nakahira et al. | |
| D665,119 S | 8/2012 | Braynt | |
| D667,584 S | 9/2012 | Beghelli | |
| D667,983 S | 9/2012 | Pickard et al. | |
| D673,711 S | 1/2013 | Pickard et al. | |
| D675,364 S | 1/2013 | Watt | |
| 8,348,481 B2 | 1/2013 | Chang | |
| D677,820 S | 3/2013 | Mayfield et al. | |
| D678,597 S | 3/2013 | Lehman et al. | |
| D679,848 S | 4/2013 | Pickard et al. | |
| D681,872 S | 5/2013 | Kong et al. | |
| D697,652 S | 1/2014 | Savani | |
| D698,975 S | 2/2014 | Blessitt et al. | |
| D698,987 S | 2/2014 | Stanley | |
| D701,988 S | 4/2014 | Clements | |
| D705,474 S | 5/2014 | Philips | |
| D705,974 S | 5/2014 | Blessitt et al. | |
| 8,827,490 B2 | 9/2014 | Kim et al. | |
| 2002/0141195 A1 | 10/2002 | Peter | |
| 2003/0031011 A1 | 2/2003 | Miller et al. | |
| 2007/0133193 A1 | 6/2007 | Kim | |
| 2008/0266905 A1 | 10/2008 | Yeh | |
| 2008/0304288 A1 | 12/2008 | Iwasaki | |
| 2009/0034241 A1 | 2/2009 | Coushaine et al. | |
| 2009/0237958 A1 | 9/2009 | Kim | |
| 2009/0316414 A1 | 12/2009 | Yang et al. | |
| 2009/0323335 A1 | 12/2009 | Yang et al. | |
| 2010/0002424 A1 | 1/2010 | Lin et al. | |
| 2011/0176306 A1* | 7/2011 | Kim | F21S 8/026 362/235 |
| 2011/0205738 A1 | 8/2011 | Peifer et al. | |
| 2011/0286239 A1 | 11/2011 | Wang et al. | |
| 2012/0020109 A1 | 1/2012 | Kim et al. | |
| 2012/0063138 A1* | 3/2012 | Leadford | F21S 2/005 362/249.02 |
| 2013/0083539 A1* | 4/2013 | Dimitriadis | F21V 7/00 362/297 |
| 2013/0083559 A1 | 4/2013 | Oh | |
| 2014/0126243 A1 | 5/2014 | Blessitt | |
| 2014/0254144 A1* | 9/2014 | Boomgaarden | F21V 23/0442 362/157 |
| 2014/0268766 A1 | 9/2014 | Lu | |
| 2014/0313776 A1 | 10/2014 | Grigore | |
| 2015/0285489 A1* | 10/2015 | Ulysse | F21V 33/006 362/183 |
| 2015/0288223 A1* | 10/2015 | Sato | G01R 17/00 307/66 |

OTHER PUBLICATIONS

ZR Series High Efficacy Troffer, image post date Apr. 13, 2012, site visited Oct. 31, 2014 (online), <http://www.cree.com/lighting/products>.

NPL date for ZR Series High Efficacy Troffer from Wayback Machine, image post date Oct. 31, 2014, site visited Oct. 31, 2014, (online), <http://web.archive.org/web/20120415000000*/http://www.cree.com/lighting/products>.

Cree CR24, image post date Apr. 28, 2011, site visited Nov. 15, 2014, (online), <http://www.ledsmagazine.com/content/dam/leds/migrated/objects/news/8/4/19/cree204272011.jpg>.

NPL date for Cree CR24, image post date Apr. 28, 2011, site visited Nov. 15, 2014, (online), <http://ledsmagazine.com/articles/2011/04/cree-delivers-led-alternative-to-linear-fluorescent-fixtures.html>.

Cree AR Series Architectural LED Troffer, image post date Mar. 9, 2013, site visited Nov. 21, 2014, (online), <http://web.archive.org/web/20130309023733/http://www.cree.com/lighting/products/indoor/troffers/ar-series>.

Office Action mailed Apr. 14, 2016 for U.S. Appl. No. 13/832,095.

* cited by examiner

LIGHTING FIXTURE WITH MOTION SENSOR AND BATTERY TEST SWITCH

TECHNICAL FIELD

The present disclosure relates generally to a lighting fixture for fitting in ceilings, walls, or other surfaces. Specifically, the present disclosure relates to a lighting fixture having a motion sensor and/or battery test switch.

BACKGROUND

With the adoption of light emitting diode (LED) light sources, new lighting systems have begun incorporating alternative means for casting, distributing, and reflecting light emitted from LEDs. Edge-lit lighting systems are one such example and are desirable for many applications. Some edge-lit lighting systems are installed within ceilings, walls, or other surfaces. For example, such a lighting system may be installed in a ceiling.

There is increasing interest for modern building to be designed to be environmentally friendly and energy efficient. Thus, it is desired for lighting systems to have the capability to autonomously turn off when the respective area is unoccupied. It is also desirable for lighting system to have a backup power source in case the primary power source becomes interrupted or cut off. Thus, some lighting system include emergency backup battery packs designed to automatically provide power in events in which the primary power is interrupted. However, such emergency backup battery packs need to be tested from time to time to ensure the functionality of the batteries.

SUMMARY

In an example embodiment of the present disclosure, a lighting system, comprises a frame. The frame further comprises a first endplate and a second endplate, each of the first endplate and the second endplate having a first end and a second end. The frame also includes a first side bar extending from the first end of the first endplate to the first end of the second endplate. The frame further includes a second side bar extending from the second end of the first endplate to the second end of the second endplate. The frame also includes a device mounting bracket extending from the first endplate to the second endplate, the device mounting bracket disposed between the first side bar and the second side bar. The lighting system further includes a first lightguide disposed between the first endplate, the second endplate, the first side bar, and the device mounting bracket. The lighting system also includes a second lightguide disposed between the first endplate, the second endplate, the second side bar, and the device mounting bracket. The lighting system also includes a motion sensor coupled to the mounting bracket.

In another example embodiment of the present disclosure, a lighting fixture includes a frame comprising a first endplate and a second endplate. Each of the first endplate and the second endplate include a first end and a second end. The frame further includes a first side bar extending from the first end of the first endplate to the first end of the second endplate. The frame also includes a second side bar extending from the second end of the first endplate to the second end of the second endplate. The frame also includes a device mounting bracket extending from the first endplate to the second endplate, the device mounting bracket disposed between the first side bar and the second side bar. The lighting fixture further includes a first lightguide disposed between the first endplate, the second endplate, the first side bar, and the device mounting bracket. The lighting fixture also includes a second light guide disposed between the first endplate, the second endplate, the second side bar, and the device mounting bracket. The lighting fixture also includes an emergency battery pack coupled to the frame. The lighting fixture also includes a test switch coupled to the mounting bracket, wherein the test switch simulates interruption of a primary power source and tests the functionality of the emergency battery pack in response to the interruption of the primary power source.

In another example embodiment of the present disclosure, a lighting fixture comprises a frame. The frame includes a first endplate and a second endplate, each of the first endplate and the second endplate having a first end and a second end. The frame further includes a first side bar extending from the first end of the first endplate to the first end of the second endplate, and a second side bar extending from the second end of the first endplate to the second end of the second endplate. The frame also includes a device mounting bracket extending from the first endplate to the second endplate, the device mounting bracket disposed between the first side bar and the second side bar. The lighting fixture also includes a first lightguide disposed between the first endplate, the second endplate, the first side bar, and the device mounting bracket. The lighting fixture includes a second light guide disposed between the first endplate, the second endplate, the second side bar, and the device mounting bracket. The lighting fixture also includes a motion sensor coupled to the frame, and a test switch coupled to the frame, wherein the test switch simulates an interruption of a primary power source.

BRIEF DESCRIPTION OF THE DRAWINGS

For a more complete understanding of the disclosure and the advantages thereof, reference is now made to the following description, in conjunction with the accompanying figures briefly described as follows.

Figure 1:
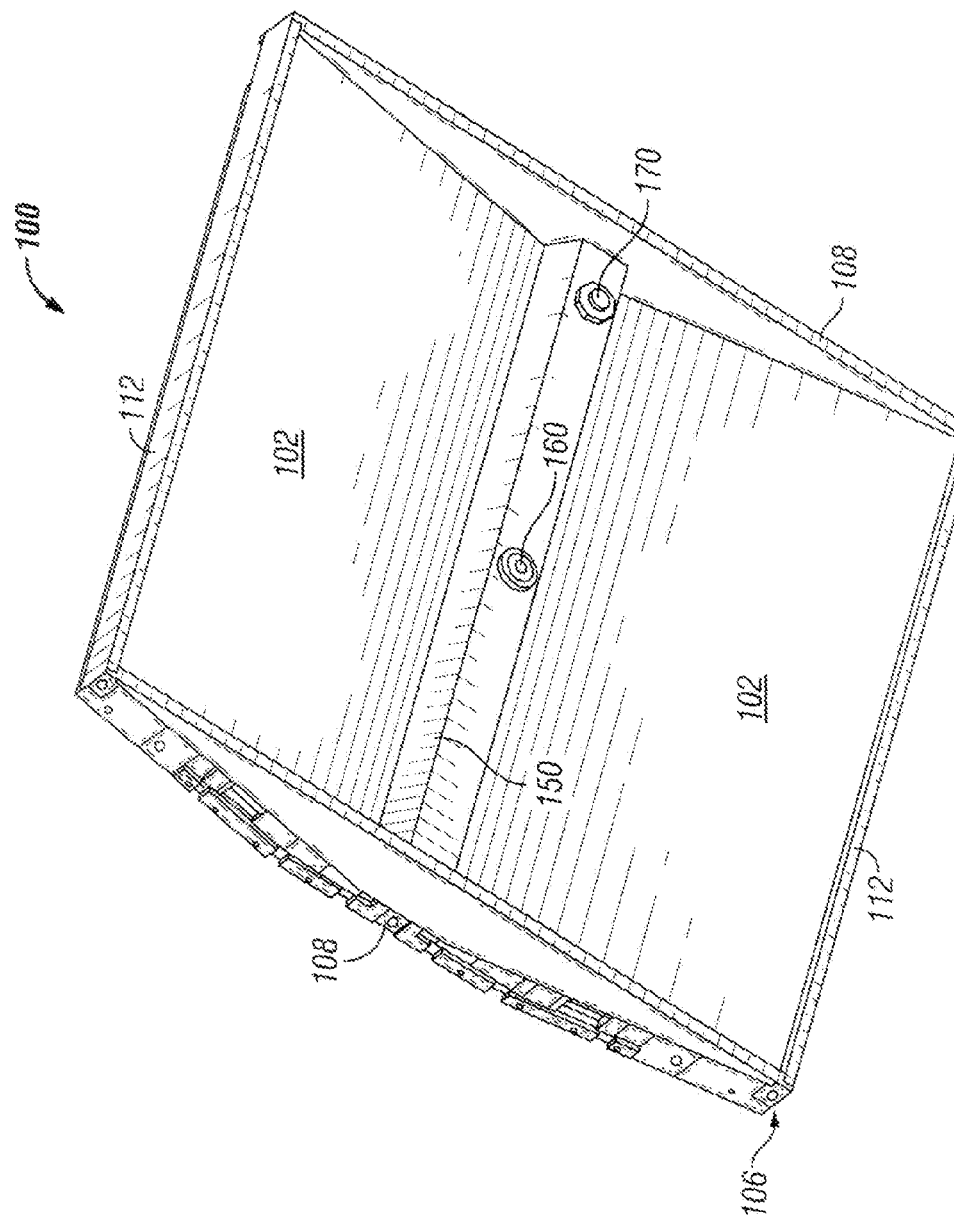
FIG. 1 illustrates a perspective view of a lighting fixture with a motion sensor and a battery test switch, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides a lighting system having a motion sensor and/or an emergency battery test switch. The motion sensor enables autonomous control functions of the lighting system such as automatically turning on when motion is sensed and automatically turning off when no motion is sensed for a certain period of time. The battery test switch is accessible after the lighting fixture is installed and allows users to test the functionality of an internal battery by simulation interruption of a primary power source. Although the present disclosure provides an example light fixture configuration to illustrate a lighting system having a motion sensor and emergency battery test switch, the light system may have configurations other than the example illustrated herein. Furthermore, the motion sensor and emergency battery test switch may be coupled to the light fixture in a different configuration than that illustrated in this example.

A lighting system of the present disclosure can comprise a light source and an element that receives, transmits, and emits light produced by the light source. In certain embodiments, the light source comprises one or more light emitting diodes. In certain embodiments, the element that receives, transmits, and emits light comprises a lightguide. The lightguide may have a generally planar format as may be provided with a slab, plate, sheet, or panel of optical material, for example. A frame may position such light emitting diodes beside an edge of the lightguide, and the lightguide may emit light in a beneficial direction as well as in an opposing direction. The frame may include a motion sensor and/or an emergency battery test switch installed therein. In certain embodiments, the frame may have one or more built-in channels that serve as wireways for routing wires that supply electrical power to the lighting system. A reflective element positioned at a standoff distance from the lightguide may redirect the light that is emitted in the opposing direction, causing it to head in the beneficial direction.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Figure 2:
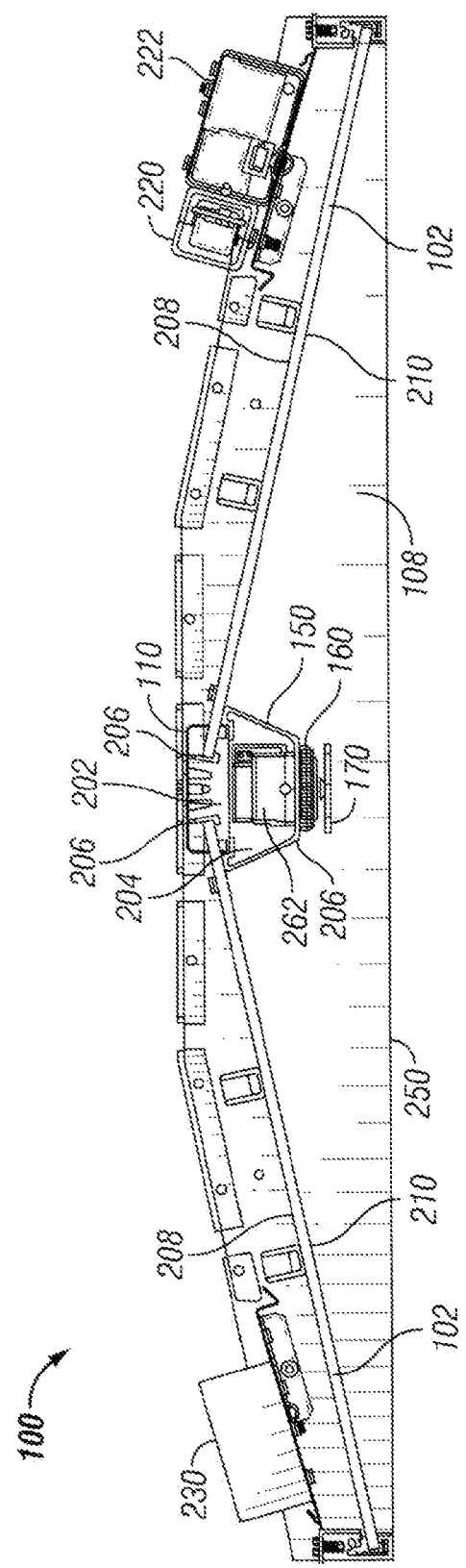
FIG. 2 illustrates a cross-sectional view of the lighting fixture of FIG. 1, in accordance with example embodiments of the present disclosure.

Turning to the figures, FIG. 1 illustrates a perspective view of a lighting fixture 100, in accordance with example embodiments of the present disclosure. FIG. 2 illustrates a cross-sectional view of the lighting fixture 100, in accordance with example embodiments of the present disclosure. Referring to FIGS. 1 and 2, in certain example embodiments, the lighting fixture 100 includes two lightguides 102 and a frame 106 surrounding and thereby retaining the lightguides 102. In certain example embodiments, the frame 106 includes two endplates 108 and two side bars 112 extending between and coupling the two endplates at opposing ends. In certain example embodiments the two endplates 108 and two side bars 112 form a rectangular outer frame. In certain example embodiments, the frame 106 further includes a reflector clamp bracket 110. The reflector clamp bracket 110 extends between the two endplate 108, adding additional structural support to the frame 106. Additionally, the reflector clamp bracket 110 divides the frame 106 into two framed portions, each of which surrounds and retains one of the lightguides 102. In certain example embodiments, the reflector clamp bracket 110 includes a heat sink element 202 which dissipates heat generated by various light sources, drivers, and other electronic devices disposed nearby.

In certain example embodiments, a device mounting bracket 150 extends between the two endplate 108. In certain example embodiments, the device mounting bracket 150 is parallel with the two side bars 112 and is disposed between the two side bars 112. In certain example embodiments, the device mounting bracket 150 is coupled to the middle of each of the two endplates 108. In certain example embodiments, the device mounting bracket 150 is coupled to the two lightguides 102 such that one side of the device mounting bracket 150 is coupled to one lightguide 102 and another side of the device mounting bracket 150 is coupled to the other lightguide 102. In certain example embodiments, the device mounting bracket 150 is below and runs along the heat sink element 202. In certain example embodiments, the device mounting bracket 150 forms an open compartment 204 facing the lightguides 102 and the heat sink element 202. The backside 206 of the device mounting bracket 150 forms a mounting surface. In certain example embodiments, when the lighting fixture 100 is mounted for use, the backside 206 of the device mounting bracket 150 may be seen. The compartment 204 can house various electronic components, wires, and the like, hiding such components from view. The illustrated embodiment shows a device mounting bracket 150 having a trapezoidal cross-sectional shape. However, in other example embodiments, the device mounting bracket 150 can have various other cross-sectional shapes, such as a round or curved shape, a rectangular shape, and other geometric and non-geometric shapes.

In certain example embodiments, the lighting fixture 100 includes a respective line of light emitting diodes 206 extending along and directed towards an edge of each of the two lightguides 102. Light emitting diodes 206 provide an example of a light source; however, in some embodiments, other appropriate light sources may be substituted. The light emitting diodes 206 emit light into the lightguides 102, and the light propagates in the two lightguides 102 guided by total internal reflection between two major surfaces 208, 210 of the lightguides 102. While light that is emitted into the lightguides 102 at relatively shallow angles undergoes total internal reflection, light at steeper angles spills through the major surfaces 208, 210. In certain example embodiments, each of the lightguides 102 includes a reflector coupled thereto or disposed above the lightguides 102.

The major surfaces 210 of the two lightguides 102 are oriented by the frame 106 for illuminating an area to be illuminated, while the major surfaces 208 are oriented facing away from the area to be illuminated. Thus, when the lighting fixture 100 is installed, light emitting through the major surfaces 208 provides illumination in a direction away from the area to be illuminated, while light emitting through the major surfaces 210 is directed towards the area to be illuminated. The reflectors are disposed above and facing the major surfaces 208 such that the reflectors can redirect the light emitted from major surfaces 208 back towards the lightguides 102 for transmission towards the area to be illuminated.

The lighting fixture 100 may be installed above or otherwise adjacent an area to be illuminated. The installation may involve replacement of one or more drop-in panels of a suspended ceiling, recess in ceiling or a wall, or mounting to a surface of a wall or ceiling or other appropriate structure, for example. Thus in operation, the lighting fixture 100 can illuminate an area by emitting light outward from the major surfaces 208 of the lightguides 102, including light that reflects off the reflectors. Light from light emitting diodes 206 adjacent a vertex of the lighting fixture 100 transmits into an edge of the lightguides 102 and scatters, distributes, and/or reflects off the reflector, and emits from the major surfaces 208 and 210 of the lightguides 102. More specifically, the light from the light emitting diodes 206 propagates along the lightguides 102 guided by total internal reflections off the major surfaces 208, 210 of the lightguides 102. Portions of the light incident to the major surfaces 208, 210 transmit through those surfaces 208, 210. Light transmitting through the major surface 210 is distributed to an area to be lit, for example a room. Light transmitting through the major surface 208 is directed back through the lightguide 102 by the reflector, for ultimate emission through the major surface 210 as beneficial illumination. In certain embodiments, each reflector comprises a mirror or specularly reflective surface. In certain embodiments, each reflector comprises a diffusely reflective surface such as a surface coated with flat white paint. In certain embodiments, each reflector 104 is faceted or comprises a surface relief pattern or other features that promote directionality of light.

Referring still to FIGS. 1 and 2, in certain example embodiments, the lighting fixture 100 further includes a motion sensor 160. In certain example embodiments, the motion sensor 160 is coupled to the device mounting bracket 150. Specifically, the lens or sensor portion of the motion sensor 160 is disposed on the backside of the device mounting bracket 150 and faces outwardly from the lighting fixture 100. In certain example embodiments, other components of the motion sensor 160 such as the motion sensor body 262 are disposed within the compartment 204 of the device mounting bracket 150. In certain example embodiments, an opening is formed in the device mounting bracket 150 that allows the lens or sensor portion of the motion sensor 160 to face out from the backside of the device mounting bracket 150 while being coupled to the motion sensor body 262 disposed within the compartment 204 of the device mounting bracket 150. In certain example embodiments, the motion sensor 160 is disposed near the middle of the device mounting bracket 150. In certain other example embodiments, the motion sensor 160 is disposed at other locations on the device mounting bracket 150. In yet other example embodiments, the motion sensor 160 is disposed elsewhere on the frame 106 of the lighting fixture 100. For example, the motion sensor 160 may be disposed on one of the side bars 112 or on one of the endplates 108. In certain example embodiments, the lighting fixture 100 also includes a motion sensor driver 220 configured to control and communicate with the motion sensor 160. In certain example embodiments, the motion sensor driver 220 is mounted on top of the lighting fixture 100 adjacent or on the frame 106. In certain example embodiments, the motion sensor driver 220 is disposed within the compartment 204 of the device mounting bracket 150. In certain example embodiments, the lighting fixture also includes an LED driver 222 for providing power to and controlling the LEDs 206. Similarly, the LED driver 222 may be disposed on the lighting fixture 100 or frame 106. The LED driver 222 may also be disposed within the compartment 204 of the device mounting bracket 150.

In certain example embodiments, the motion sensor 160 monitors motion in a space such as a room in which the lighting fixture 100 is installed. The motion sensor 160 may transmit a signal to a main controller or processor of the lighting fixture 100 when motion is detected within the monitored area. Thus, the lighting fixture 100 may be configured to turn on automatically when motion is sensed, indicating occupancy. The lighting fixture 100 may be configured to turn off automatically when no motion is sensed for a predetermined period of time. The motion sensor 160 may include various types of motion sensors, such as but not limited to passive infrared sensors, ultrasonic sensors, microwave sensors, camera-based sensors, and the like.

In certain example embodiments, the lighting fixture 100 further includes an emergency battery pack 230. The emergency battery pack 230 is configured to provide power to the LEDs 206 should be primary power supplied to the LEDs 206 be interrupted. In certain example embodiments, the emergency battery pack 230 is disposed on the lighting fixture 100 along the frame 106. In certain example embodiments, the lighting fixture further includes an emergency battery test switch 170. The function of the emergency battery test switch 170 is to test the proper functionality of the emergency backup battery pack 230 by simulating interruption of the primary power source. In certain example embodiments, the emergency battery pack 230 is hidden from view or access when the lighting fixture 100 is installed. In certain example embodiments, the emergency battery test switch 170 is visible and/or accessible when the lighting fixture 100 is installed so that the test may be performed while the lighting fixture is operational. In certain example embodiments, the emergency backup battery test switch 170 is disposed on the backside 206 of the device mounting bracket 150 such that the emergency backup battery test switch 170 faces outwardly. In certain example embodiments, the electronics and other associated components of the emergency backup battery test switch 170 are disposed within the compartment 204 of the device mounting bracket 150. In certain example embodiments, the emergency backup battery test switch 170 is disposed at another location on the frame 106 of the lighting fixture 100. Other electronic components such as indicator lights associated with the motion sensor 160 or the emergency backup battery test switch 170 can be disposed on the device mounting bracket 150 or elsewhere on the frame 106 of the lighting fixture 100.

Figure 3:
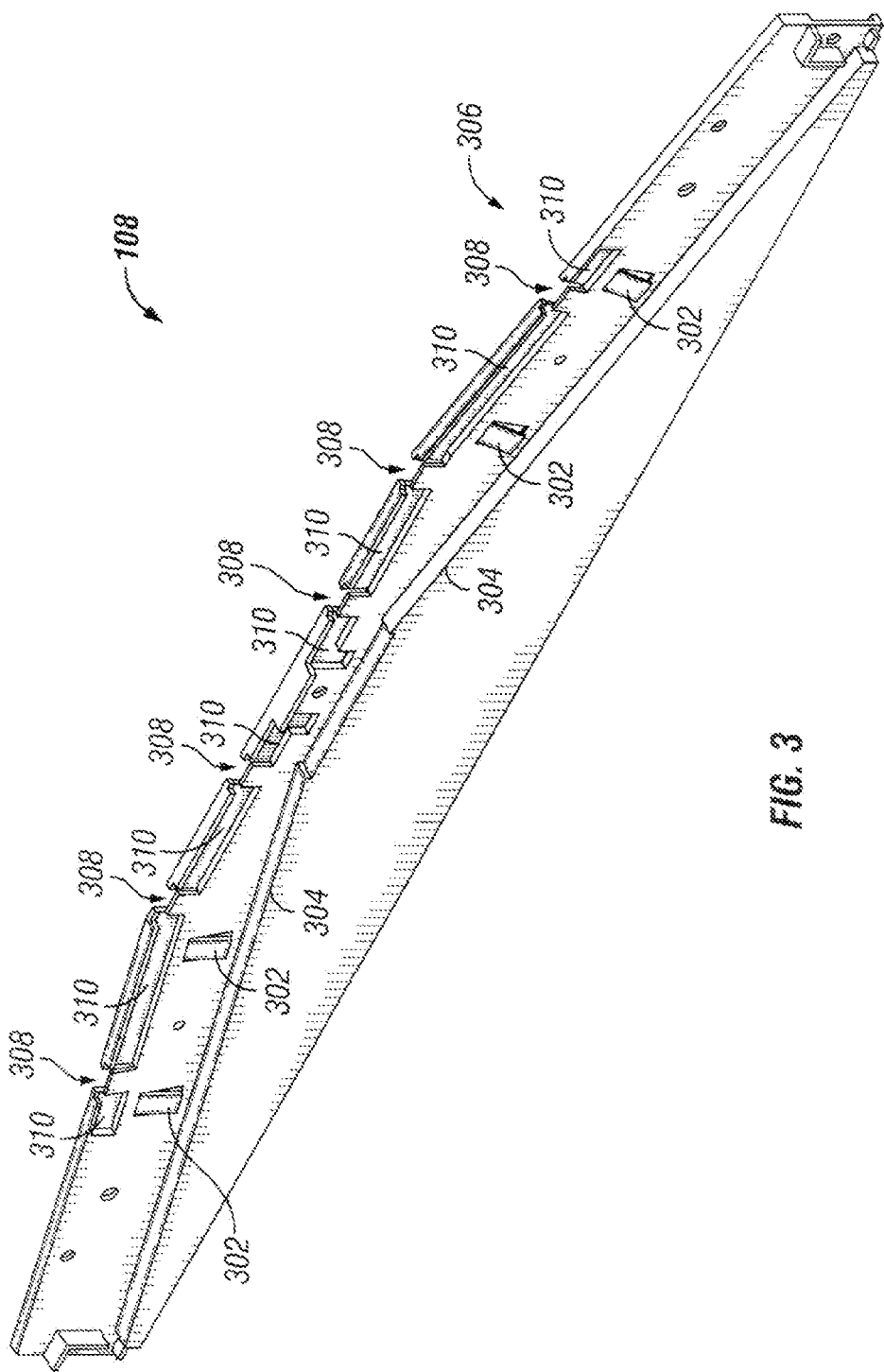
FIG. 3 illustrates a detailed perspective view of an endplate of the lighting fixture of FIG. 1, in accordance with example embodiments of the present disclosure.

FIG. 3 illustrates a detailed perspective view of one of the endplates 108, in accordance with example embodiments of the present disclosure. In certain example embodiments, the endplates 108 comprise reflector and lightguide restraints 302 for restraining the reflectors and the lightguides 102 in the frame 106. In certain example embodiments, for each reflector, the restraints 302 are positioned along the reflector edges to urge the reflector edge against the adjoining lightguide edge. The endplate 108 further includes an two angled shoulders 304 for supporting the lightguides 102. In certain example embodiments, the restraints 302 urge the lightguides 102 against the shoulders 304 of the endplate 108. In the illustrated example embodiment, each restraint 302 comprises a flap of material on the frame endplate 108 that is angled inward, over the adjoining edges of the reflector and lightguide 102. In certain example embodiments, the flap is an integral and seamless part of the frame endplate 108. In other embodiments, the flap may be fastened to the endplate 108 using adhesive, screws, rivets, or another appropriate means. Accordingly, the lightguide edge is sandwiched between the shoulder 304 of the endplate 108 and the reflector edge or the restraints directly. In certain example embodiments, portions of the reflector that are away from the reflector edges are raised so that an air gap is provided between a majority of the reflector's surface area and the lightguide 102.

Referring still to FIG. 3, in certain example embodiments, the lighting fixture 100 includes a wire management system 306 that is integrated with the frame 106 or endplate 108. The wire management system 306 routes electrical lines that supply electrical power for the light emitting diodes 206, motion sensor 160, test switch 170, emergency battery pack 230, or any other electronic components. In the illustrated example embodiment, the electrical lines comprise individually insulated electrical conductors or wires. The wire management system 306 maintains the electrical lines in a linear array. In certain example embodiments, the illustrated wire management system 306 provides a channel that extends along an upper edge of the endplate 108. Segments of the channel are located on an inward facing side of the endplate 108, as illustrated in FIG. 3. Other segments of the channel are located on an outward facing side of the endplate 108. More specifically, the inward facing side comprises recessed regions 310 in which the electrical lines extend lengthwise next to one another. Tabs 308 are located between the recessed regions 310, and the electrical lines extend on the outward facing side of the endplate 108 at those tabs 308. Accordingly, the channel and the electrical lines oscillate or weave between sides of the endplate 108 and thus sides of the frame 106. Openings or slots are provided at the transitions between sides of the endplate 108 to facilitate lacing the electrical lines into the channel.

In various embodiments, the lighting fixture 100 may vary in shape and size. For example, although the lighting fixture 100 illustrated in FIG. 1 has a footprint or outline that is approximately square, lighting fixtures of triangular, square, rectangular, polygonal, circular, or other appropriate shapes are within the scope and spirit of the embodiments described herein. The lighting fixture 100 may be formed from various types of suitable materials. In some exemplary embodiments, the frame 106 is formed from a combination of plastic and metal, and the lightguides 102 are formed from a plastic, polymer, acrylic, glass, or other suitable material and may include reinforcements such as glass. In the example embodiment of FIG. 1, the endplates 108 can be made of plastic via molding, and the reflector clamp bracket 110 can comprise aluminum or other suitable metal or rigid material. In the illustrated example embodiment, elements of the lighting fixture 100 are arranged in a polyhedron. The lightguides 102 form two faces of the polyhedron, each with a respective edge near a vertex at the apex of the lighting fixture 100. In the illustrated example embodiment, the two lightguides 102 converge in an obtuse angle. The endplates 108 form two additional faces of the polyhedron. A fifth face of the polyhedron is provided by the aperture 250 of the lighting fixture 100, which is the portion of the lighting fixture 100 that emits light into the area to be illuminated. Thus, the outline or footprint of the lighting system can provide a fifth polyhedron face opposite the vertex formed between the two lightguides 102.

Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A lighting system, comprising:
a frame comprising:
 a first endplate and a second endplate,
  wherein each of the first endplate and the second endplate has a first end and a second end that is disposed opposite to the first end,
  wherein each of the first endplate and the second endplate includes:
   a first shoulder that extends from a portion adjacent the first end toward a top longitudinal edge of the respective end plate, and a second shoulder that extends from a portion adjacent the second end toward the top longitudinal edge of the respective end plate, wherein the first shoulder and the second shoulder are inclined upward toward the top longitudinal edge of the respective end plate and toward each other, and
   a plurality of restraints disposed above each of the first shoulder and the second shoulder, wherein each restraint comprises a flap of material of the respective end plate that is angled inward;
 a first side bar extending from the first end of the first endplate to the first end of the second endplate;
 a second side bar extending from the second end of the first endplate to the second end of the second endplate; and
 a device mounting bracket extending from the first endplate to the second endplate, the device mounting bracket disposed between the first side bar and the second side bar;
a first lightguide disposed between the first endplate, the second endplate, the first side bar, and the device mounting bracket;
a second lightguide disposed between the first endplate, the second endplate, the second side bar, and the device mounting bracket,
 wherein each of the first lightguide and the second lightguide is configured to: receive light emitted by a light source through a light receiving edge of the respective lightguide and exit the light to a desired area of illumination through a major surface of the respective lightguide,
 wherein a first supporting edge and a second supporting edge of the first lightguide are disposed within the frame such that the first supporting edge of the first lightguide rests on the first shoulder of the first endplate and the second supporting edge of the first lightguide rests on the first shoulder of the second endplate,
 wherein a first supporting edge and a second supporting edge of the second lightguide are disposed within the frame such that the first supporting edge of the second lightguide rests on the second shoulder of the first endplate and the second supporting edge of the second lightguide rests on the second shoulder of the second endplate, and
 wherein the first and second supporting edges of the first lightguide and the first and second supporting edges of the second lightguide are secured by the plurality of restraints disposed above the first shoulder and the second shoulder in each of the first endplate and the second endplate; and
a motion sensor coupled to the device mounting bracket.

2. The lighting system of claim 1, wherein the light source includes a plurality of LEDs disposed at the light receiving edge of the first lightguide and the light receiving edge of the second lightguide and oriented to transmit the light into the first lightguide and the second lightguide.

3. The lighting system of claim 1, further comprising a motion sensor driver coupled to the frame.

4. The lighting system of claim 1, wherein the device mounting bracket comprises an internal compartment and an external surface, wherein the motion sensor is coupled to the external surface.

5. The lighting system of claim 4, wherein the internal compartment contains one or more electronic components.

6. The lighting system of claim 1, wherein the frame positions the first lightguide and the second light guide according to a polyhedron, with the first lightguide forming a first face of the polyhedron, the second lightguide forming a second face of the polyhedron, and a third face of the polyhedron providing an aperture, and wherein the first lightguide and the second lightguide are oriented to provide illumination through the aperture.

7. A lighting fixture, comprising:
a frame comprising:
a first endplate and a second endplate,
wherein each of the first endplate and the second endplate has a first end and a second end that is disposed opposite to the first end,
wherein each of the first endplate and the second endplate includes:
a first shoulder that extends from a portion adjacent the first end toward a top longitudinal edge of the respective end plate, and a second shoulder that extends from a portion adjacent the second end toward the top longitudinal edge of the respective end plate, wherein the first shoulder and the second shoulder are inclined upwards toward the top longitudinal edge of the respective end plate, and
a plurality of restraints disposed above each of the first shoulder and the second shoulder, wherein each restraint comprises a flap of material of the respective end plate that is angled inward;
a first side bar extending from the first end of the first endplate to the first end of the second endplate;
a second side bar extending from the second end of the first endplate to the second end of the second endplate;
a device mounting bracket extending from the first endplate to the second endplate, the mounting bracket disposed between and substantially parallel to the first side bar and the second side bar;
a first lightguide disposed between the first endplate, the second endplate, the first side bar, and the device mounting bracket;
a second lightguide disposed between the first endplate, the second endplate, the second side bar, and the device mounting bracket,
wherein each of the first lightguide and the second lightguide is configured to: receive light emitted by a light source through a light receiving edge of the respective lightguide and exit the light to a desired area of illumination through a major surface of the respective lightguide,
wherein a first supporting edge and a second supporting edge of the first lightguide are disposed within the frame such that the first supporting edge of the first lightguide rests on the first shoulder of the first end plate and the second supporting edge of the first lightguide rests on the first shoulder of the second end plate,
wherein a first supporting edge and a second supporting edge of the second lightguide are disposed within the frame such that the first supporting edge of the second lightguide rests on the second shoulder of the first end plate and the second supporting edge of the second lightguide rests on the second shoulder of the second end plate, and
wherein the first and second supporting edges of the first lightguide and the first and second supporting edges of the second lightguide are secured by the plurality of restraints disposed above the first shoulder and the second shoulder in each of the first endplate and the second endplate;
an emergency battery pack coupled to the frame; and
a test switch coupled to the device mounting bracket, wherein the test switch simulates interruption of a primary power source and tests the functionality of the emergency battery pack in response to the interruption of the primary power source.

8. The lighting fixture of claim 7, wherein the test switch comprises a push button.

9. The lighting fixture of claim 7, wherein the device mounting bracket comprises an internal compartment and an external surface, wherein a motion sensor is coupled to the external surface.

10. The lighting fixture of claim 9, wherein the internal compartment contains one or more electronic components.

11. The lighting fixture of claim 7, wherein the frame positions the first lightguide and the second light guide according to a polyhedron, with the first lightguide forming a first face of the polyhedron, the second lightguide forming a second face of the polyhedron, and a third face of the polyhedron providing an aperture, and wherein the first lightguide and the second lightguide are oriented to provide illumination through the aperture.

12. The lighting fixture of claim 7, comprising:
a plurality of electrical lines that are electrically connected to the light source and that are supported by a channel formed in the frame, wherein the light source includes a plurality of LEDs.

13. The lighting fixture of claim 7, wherein each of the first and second lightguides comprises a reflector disposed thereon.

14. A lighting fixture, comprising:
a frame comprising:
a first endplate and a second endplate,
wherein each of the first endplate and the second endplate comprises a first end, a second end disposed opposite to the first end, and an upper longitudinal edge disposed between the first end and the second end,
wherein the upper longitudinal edge of at least one of the first endplate and the second endplate comprises a wire management system that includes a plurality of recessed channels and a plurality of tabs that are configured to maintain electrical wires in a linear array, wherein the electrical wires are configured to supply power to one or more electrical components of the lighting fixture,
wherein each tab is disposed between a respective pair of recessed channels of the plurality of recessed channels, and
wherein each recessed channel is configured facing inward toward the frame and each tab is configured facing outward away from the frame such that they are configured to weave the electrical wires between the opposite surfaces of the respective endplate;
a first side bar extending from the first end of the first endplate to the first end of the second endplate;
a second side bar extending from the second end of the first endplate to the second end of the second endplate;
a device mounting bracket extending from the first endplate to the second endplate, the device mounting bracket disposed between the first side bar and the second side bar;
a first lightguide disposed between the first endplate, the second endplate, the first side bar, and the device mounting bracket;
a second lightguide disposed between the first endplate, the second endplate, the second side bar, and the device mounting bracket,
wherein each of the first lightguide and the second lightguide is configured to: receive light emitted by a light source through an edge of the respective lightguide and exit the light to a desired area of illumination through a major surface of the respective lightguide;
a motion sensor coupled to the frame; and
a test switch coupled to the frame, wherein the test switch simulates an interruption of a primary power source.

15. The lighting fixture of claim 14, wherein the motion sensor is a passive infrared sensor, an ultrasonic sensor, or a camera-based sensor.

16. The lighting fixture of claim 14, further comprising an emergency backup battery pack, wherein the test switch tests the functionality of the emergency backup battery pack by simulating the interruption.

17. The lighting system of claim 14, wherein the device mounting bracket comprises an internal compartment and an external surface, wherein the motion sensor and test switch are coupled to the external surface.

18. The lighting system of claim 17, wherein the internal compartment contains the one or more electrical components associated with the lighting fixture, the motion sensor, and the test switch.

\* \* \* \* \*